(12) United States Patent
Rea et al.

(10) Patent No.: US 6,950,280 B2
(45) Date of Patent: Sep. 27, 2005

(54) MAGNETIC HEAD HAVING A HEAT DISSIPATING STRUCTURE

(75) Inventors: Christopher James Thompson Rea, Edina, MN (US); Ladislav Rudolf Pust, Savage, MN (US); Michael Christopher Kautzky, Eagan, MN (US); Mallika Kamarajugadda, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 173 days.

(21) Appl. No.: 10/383,140

(22) Filed: Mar. 6, 2003

(65) Prior Publication Data

US 2004/0080869 A1 Apr. 29, 2004

Related U.S. Application Data (60) Provisional application No. 60/422,085, filed on Oct. 29, 2002.

(51) Int. Cl.⁷ .............................................. G11B 5/147
(52) U.S. Cl. ...................................... 360/126; 360/128
(58) Field of Search ................................. 360/126, 128

(56) References Cited

U.S. PATENT DOCUMENTS

| | | | |
|---|---|---|---|
| 5,361,242 A | 11/1994 | Chaya et al. ............... 369/13 |
| 5,617,071 A | 4/1997 | Daughton ................... 338/32 |
| 5,644,455 A | 7/1997 | Schultz ...................... 360/113 |
| 5,919,567 A | 7/1999 | Okada et al. ............... 428/413 |
| 5,930,084 A | 7/1999 | Dovek et al. ............... 360/113 |
| 5,930,086 A | 7/1999 | Chaug et al. ............... 360/113 |
| 5,936,806 A | 8/1999 | Pan et al. ................... 360/104 |
| 5,991,113 A | 11/1999 | Meyer et al. ................ 360/75 |
| 6,181,532 B1 | 1/2001 | Dovek et al. ............... 360/321 |
| 6,188,549 B1 | 2/2001 | Wiitala ....................... 360/320 |
| 6,239,955 B1 | 5/2001 | Dovek et al. ............... 360/321 |
| 6,252,749 B1 | 6/2001 | Hayakawa .................. 360/320 |
| 6,307,720 B1 | 10/2001 | Hayakawa .................. 360/313 |
| 6,381,094 B1 | 4/2002 | Gill ............................ 360/126 |
| 6,396,660 B1 | 5/2002 | Jensen et al. ............... 360/126 |
| 6,396,670 B1 | 5/2002 | Murdock .................... 360/319 |
| 6,404,603 B1 | 6/2002 | Inoue et al. ................ 360/320 |
| 6,459,551 B1 | 10/2002 | Hayakawa .................. 360/313 |
| 6,493,183 B1 | 12/2002 | Kasiraja et al. ............ 360/126 |
| 6,760,191 B1 * | 7/2004 | Yan et al. ................... 360/128 |
| 6,859,343 B1 * | 2/2005 | Alfoqaha et al. ........... 360/126 |
| 2004/0246630 A1 * | 12/2004 | Otomo ....................... 360/126 |

\* cited by examiner

*Primary Examiner*—Robert S. Tupper
(74) *Attorney, Agent, or Firm*—Westman, Champlin & Kelly (57) ABSTRACT

A magnetic head having a heat dissipating structure formed of a thermally conductive material that includes a top heat transfer sheet overlaying a second portion of a writer conducting coil; a bottom heat transfer sheet formed in a back region of a bottom pole layer, displaced from a back side of a bottom writer pole, and underlaying the second portion of the writer conducting coil; a first side heat transfer member formed in a coil layer adjacent a first side of the writer conducting coil; and/or a second side heat transfer member formed in the coil layer adjacent a second side of the writer conducting coil.

28 Claims, 9 Drawing Sheets

MAGNETIC HEAD HAVING A HEAT DISSIPATING STRUCTURE

CROSS-REFERENCE TO RELATED APPLICATION

This application claims priority from U.S. Provisional Application No. 60/422,085 filed on Oct. 29, 2002 for inventors Christopher J. T. Rea, Ladislav Rudolf Pust, Michael Christopher Kautzky and Mallika Kamarajugadda and entitled WRITE INDUCED PTR SUPPRESSION STRUCTURES.

FIELD OF THE INVENTION

The present invention relates generally to magnetic heads for use in disc drive storage systems, and more particularly, but not by limitation to a magnetic head having a heat dissipating structure that reduces the likelihood of thermally induced head performance degradation.

BACKGROUND OF THE INVENTION

Disc drives are the primary devices employed for mass storage of computer programs and data. Disc drives typically use rigid discs, which are coated with a magnetizable medium to form a recording layer in which data can be stored in a plurality of circular, concentric data tracks. Disc drives employ read/write heads that includes a reader for reading data from the data tracks and a writer for writing data to the data tracks.

Typical readers include a magnetoresistive or giant magnetoresistive read element that is adapted to read magnetic flux transitions recorded to the tracks, which represent bits of data. The magnetic flux from the recording medium causes a change in the electrical resistivity of the read element, which can be detected by measuring a voltage across the read element in response to an applied sense current. The voltage measurement can then be decoded to determine the recorded data. The writer includes a conducting coil configured to generate a magnetic field that aligns the magnetic moments of the recording layer to represent the desired bits of data.

There is a never-ending demand for higher data storage capacity in disc drives. One measure of the data storage capacity is the areal density of the bits at which the disc drive is capable of reading and writing. The areal density is generally defined as the number of bits per unit length along a track (linear density and units of bits per inch) multiplied by the number of tracks available per unit length in the radial direction of the disc (track density and units of track per inch or TPI). Currently, there is a need for areal densities on the order of 100 gigabits per square inch, which requires a track density on the order of 100–200 kTPI and greater.

In order to meet such high areal recording density demands read/write heads are formed smaller. Additionally, an active region of an air-bearing surface (ABS) of the head, where data reading and writing operations occur, is positioned closer to the recording medium (reduced head-medium separation). The heads are also configured to operate at higher frequencies which translates into an increase in current that is applied to the power that is applied to the heads. As a result, a greater amount of heat is generated within the heads, which can degrade their performance. For example, high local temperature concentrations in a head cause the materials of the reader and writer to expand. The resulting local stresses that are generated in the reader and writer can deform the shape of the head. This thermally induced expansion of the head can degrade data reading and writing performance by varying the head-media spacing, particularly at the active region of the ABS.

Embodiments of the present invention provide solutions to these and other problems, and offer other advantages over the prior art.

SUMMARY OF THE INVENTION

The present invention is directed to a magnetic head that includes a heat dissipating structure for reducing thermally induced performance degradation. The magnetic head includes top and bottom writer poles, a writer conducting coil, and a heat dissipating structure. The top and bottom writer poles are respectively formed in top and bottom pole layers. Each pole includes a pole tip at an air-bearing surface (ABS) and a back side adjacent a back region. The writer conducting coil is formed in a coil layer, extends from the ABS, includes a first portion disposed between the top and bottom writer poles and a second portion located beyond the top and bottom writer poles. The heat dissipating structure includes a top heat transfer sheet formed of a thermally conductive material and overlaying the second portion of the conducting coil; a bottom heat transfer sheet formed of a thermally conductive material in the back region of the bottom pole layer, displaced from the back side of the bottom writer pole, and underlaying the second portion of the conducting coil; a first side heat transfer member formed of a thermally conductive material in the coil layer adjacent a first side of the conducting coil; and/or a second side heat transfer member formed of a thermally conductive material in the coil layer adjacent a second side of the conducting coil.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
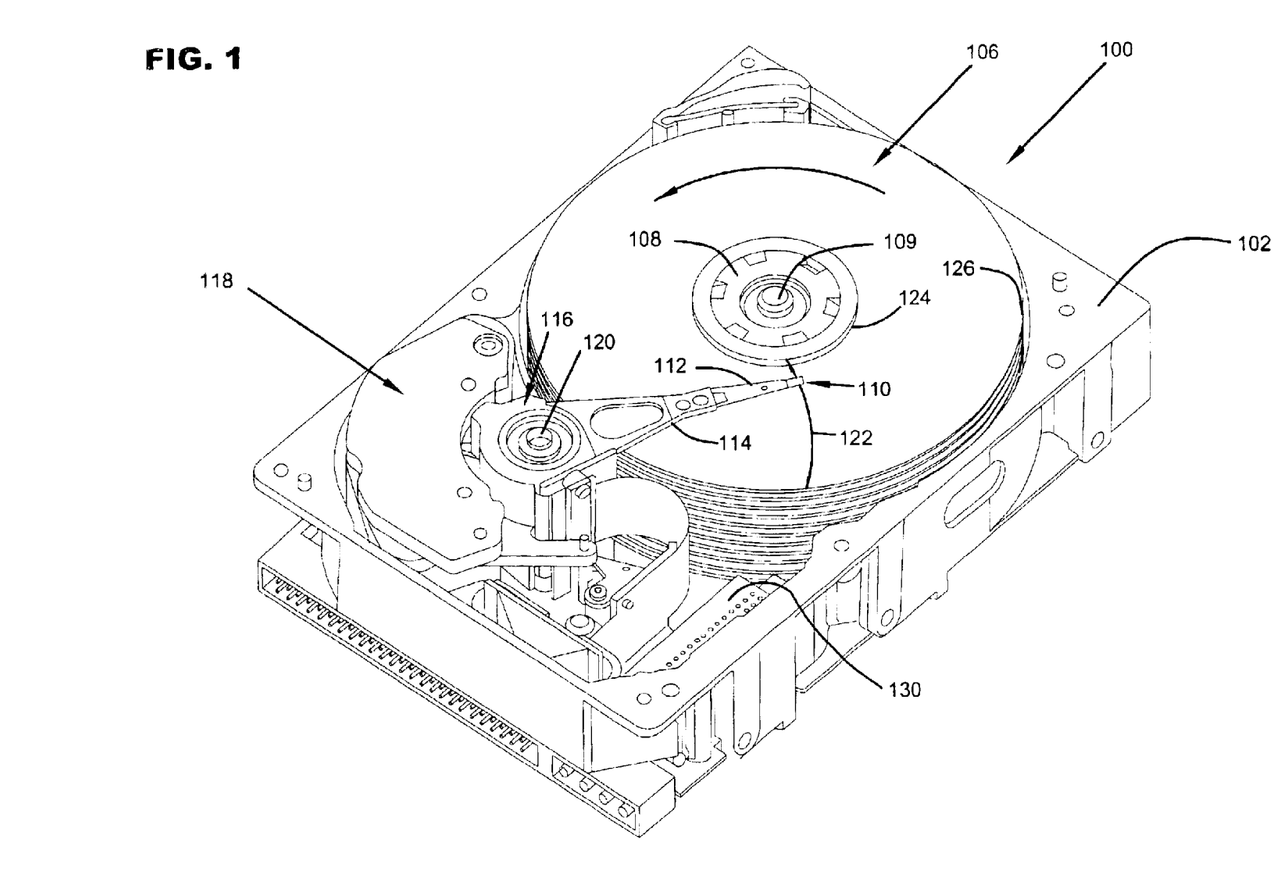
FIG. 1 is an isometric view of a disc drive in which embodiments of the present invention are useful.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated read/write head 110 which is mounted to disc drive 100 for communication with the disc surface. In the example shown in FIG. 1, heads 110 are each carried by sliders that are supported by suspensions 112, which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
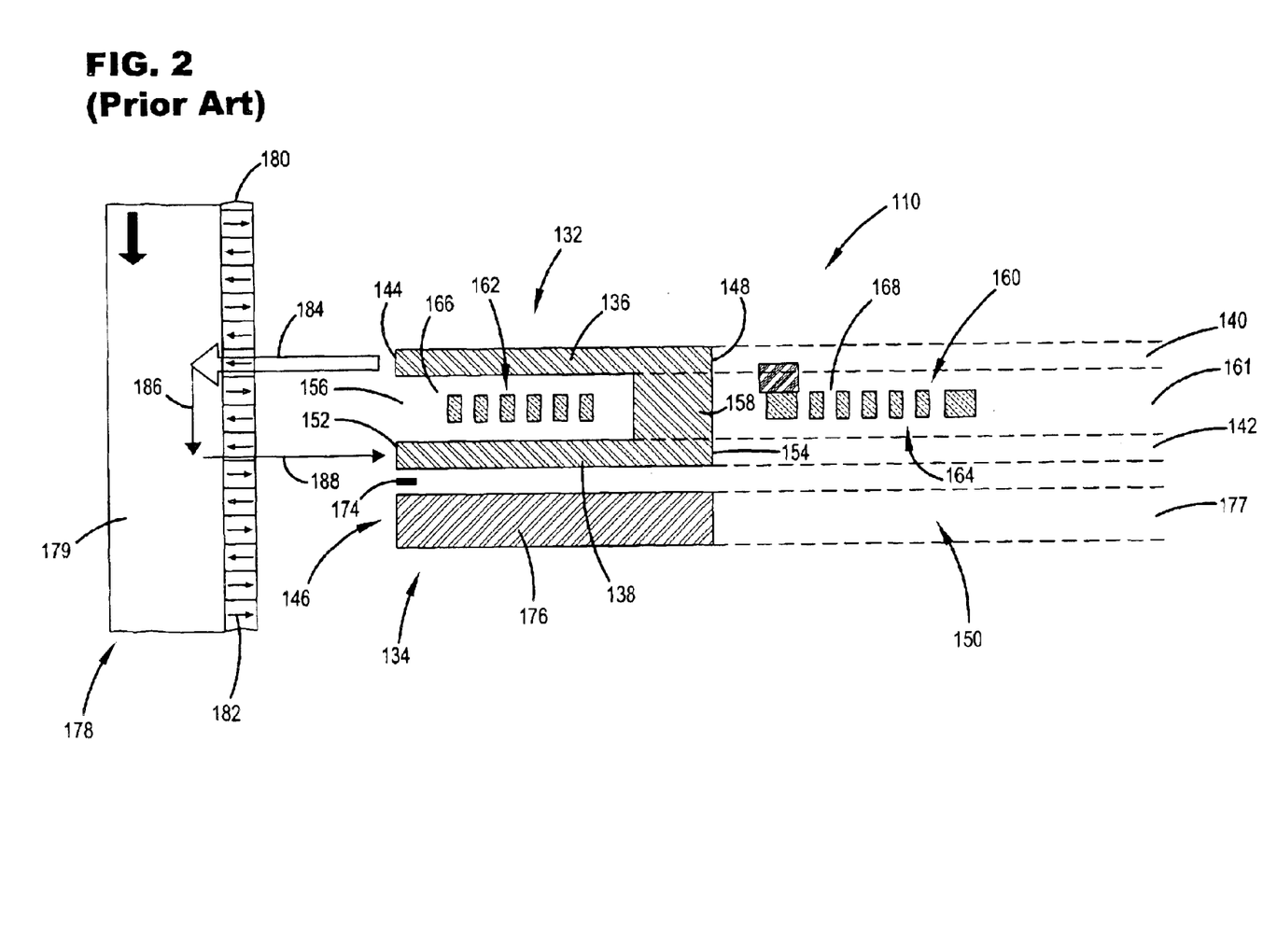
FIG. 2 is a simplified side cross-sectional view of a read/write head in accordance with the prior art.

FIG. 2 is a simplified side cross-sectional view of a read/write head 110 in accordance with the prior art. Head 110 includes a writer 132 and a reader 134. Writer 132 includes top and bottom writer poles 136 and 138 formed of a magnetically conductive material in top and bottom pole layers 140 and 142 (boundaries defined by dashed lines), respectively. Top writer pole 136 includes a pole tip 144 that forms a portion of an air-bearing surface (ABS) 146 of head 110 and a back side 148 adjacent a back region 150 of head 110. Similarly, bottom writer pole 138 includes a pole tip 152 that forms a portion of ABS 146 and a back side 154 adjacent back region 150. Top and bottom writer poles 136 and 138 are separated by a writer gap 156 and are connected at a back gap "via" 158 to form a C-shaped magnetic core. Writer 132 also includes a conducting coil 160 formed in a coil layer 161 that extends between top and bottom writer poles 136 and 138 and around back gap 158. Conducting coil 160 includes a first portion 162 disposed between top and bottom writer poles 136 and 138, and a second portion 164 that extends beyond top and bottom writer poles 136 and 138 and into back region 150. A non-magnetic dielectric material 166 is formed in writer gap 156 and insulates first portion 162 of conducting coil 160 from top and bottom writer poles 136 and 138. The insulating material 166 typically has a low thermal conductivity. Additional insulating material 168 typically surrounds second portion 164 of conducting coil 160 outside of top and bottom writer poles 136 and 138. As with insulating material 166, insulating material 168 is typically a non-magnetic dielectric material having a low thermal conductivity. Alumina ($Al_2O_3$ is one material that is typically used as insulating materials 166 and 168.

Reader 134 includes a read element 174 that is positioned adjacent ABS 146 and between bottom writer pole 138 and a reader shield 176 that is formed in a reader shield layer 177. Bottom writer pole 138 and reader shield 176 operate to isolate the reading element 174 from external magnetic fields that could affect its sensing of bits of data that have been recorded on disc 178.

A magnetic circuit is formed in the writer 132 by top and bottom writer poles 136 and 138, and back gap 158. The depicted writer 132 of FIG. 2 is configured for perpendicular recording, in which the magnetic circuit further includes a soft magnetic layer 179 of disc 178, which underlays a hard magnetic or recording layer 180. Recording layer 180 includes vertical magnetic moments 182, each of which represent a bit of data in accordance with their up or down orientation. In operation, an electrical current is caused to flow in conducting coil 160, which induces a magnetic field that is conducted through the magnetic circuit. The magnetic circuit causes the magnetic field to travel through pole tip 144 and into recording layer 180 of disc 178 as indicated by arrow 184. Next, the magnetic field is directed through soft magnetic layer 179 of disc 178, as indicated by arrow 186, and then back through recording layer 180 to pole tip 152 of bottom writer pole 138, as indicated by arrow 188. Finally, the magnetic signal is conducted back to top writer pole 136 through a return path that includes bottom writer pole 138 and back gap 158.

The magnetic circuit for a writer that is configured to perform longitudinal recording does not include the soft magnetic layer 179 of the disc 178. Instead, the recording medium includes a recording layer (not shown) having horizontally aligned magnetic moments. Magnetic flux that fringes across a writer gap that is typically narrower than the depicted writer gap 156 from top writer pole 136 to bottom writer pole 138 and orients the magnetic moments in the direction of the magnetic field. Bottom writer pole 138 receives magnetic signals from top writer pole 136 and, along with back gap 158, provides a return path to conduct the signals back to top writer pole 136.

In order to meet the ever-increasing demands for higher areal recording densities, heads 110 are formed smaller and are designed to operate closer to the disc 178. Additionally, writer 132 and reader 134 of each of the heads 110 are configured to operate at higher frequencies. The higher operating frequency of the heads 110 results in an increase in the power that is applied to the writer 132 and reader 134. As a result, a greater amount of heat is generated within the head 110. Unfortunately, typical head designs cover second portion 164 of conducting coil 160 including back region 150 with insulating materials 168 having a low thermal conductance, such as alumina ($Al_2O_3$), which is typically also used as insulating material 166 to insulate first portion 162 of conducting coil 160 and fill writer gap 156, as mentioned above. As a result, high local temperature concentrations can develop in writer 132 and reader 134, which can cause their components to expand. Such thermal induced expansion can deform the shape of head 110, particularly at the interface between ABS 146 and disc 178, which can cause an undesirable variation in the head-media spacing and a degradation in data reading and writing performance.

The present invention is generally directed to a magnetic head that includes a heat dissipating structure that conducts heat away from writer 132 and reader 134 and reduces the likelihood of thermally induced head deformation. In general the heat dissipating structure draws heat from writer 132 and/or reader 134 and dissipates the heat away from an active region of the ABS 146 that is proximate the read element 124 and writer pole tips 144 and 152 to reduce thermally induced performance degradation in the head 110.

The heat dissipating structure is formed of a thermally conductive material that has a high thermal conductivity ($K_{bulk}$) of approximately 10 Watts/meter-Kelvin or greater, a high modulus of elasticity, and a coefficient of thermal expansion of approximately 6 ppm/° C. or less. Examples of such preferred materials include silicon carbide (SiC), aluminum nitride (AlN), tungsten (W), silicon (Si), and molybdenum (Mo), which provide greater thermal conductance than alumina. The thermally conductive material can be electrically conductive when it is separated from electrically sensitive elements, such as conducting coil 160 of writer 132, by a thin isolation layer. Alternatively, the need for an isolation layer can be avoided when the thermally conductive material is a dielectric, such as silicon carbide, which can encapsulate electrically sensitive elements to maximize the efficiency of the heat transfer there between. Similarly, the thermally conductive material is preferably non-magnetic when, for example, it contacts either of the top or bottom writer poles 136 and 138, or back gap 158.

Figure 3:
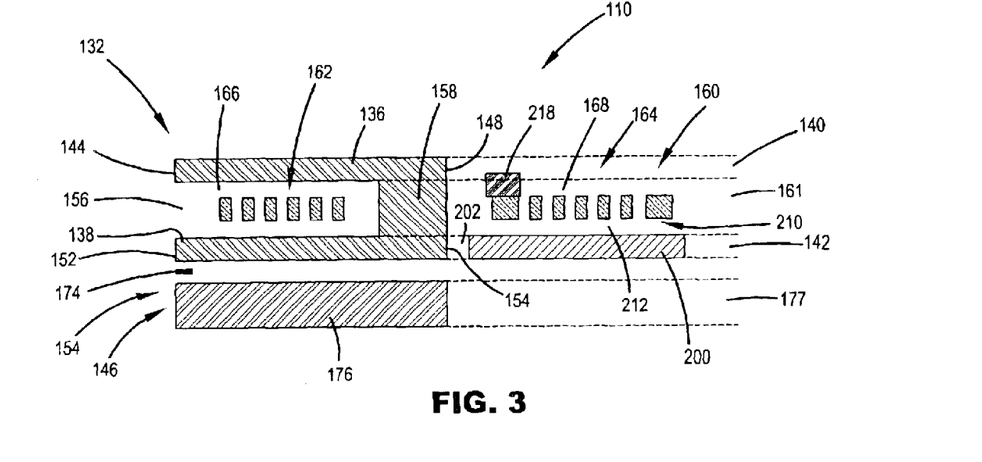
FIGS. 3–6 are simplified cross-sectional views of magnetic heads that include a heat dissipating structure in accordance with embodiments of the invention.
Figure 4:
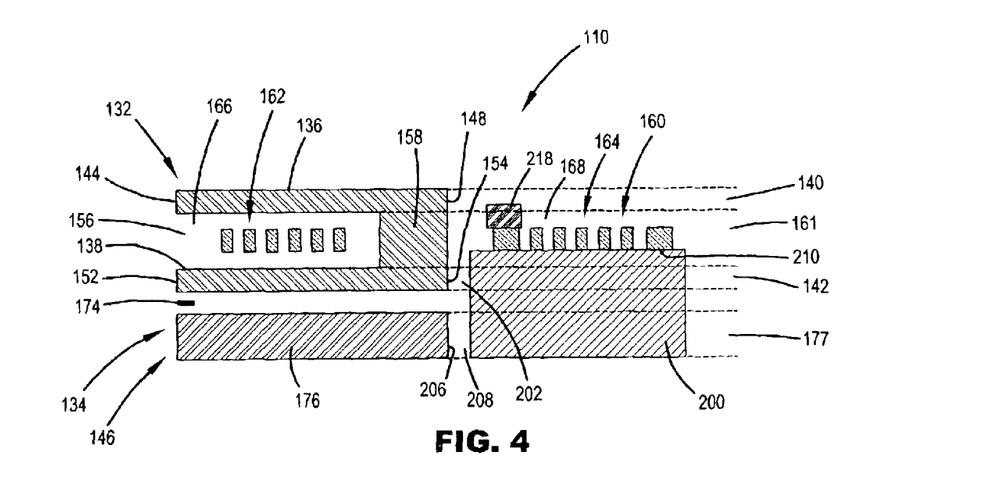

FIGS. 3 and 4 are simplified cross-sectional views of magnetic heads 110 that include a heat dissipating structure in the form of a bottom heat transfer sheet 200. In the embodiment depicted in FIG. 3, bottom heat transfer sheet 200 is formed in bottom pole layer 142 such that it underlays second portion 164 of conducting coil 160. Additionally, bottom heat transfer sheet 200 is displaced slightly from back side 154 of bottom writer pole 138 by a gap 202 that is filled with a non-magnetic material. Gap 202 is preferably formed as small as possible (e.g., 0.25 microns) to maximize heat transfer from the bottom pole 138 to the bottom heat transfer sheet 200 without affecting the performance of writer 132. This provides an effective thermal pathway through the head 110 and away from ABS 146 while allowing free selection of the thermally conductive material used to form the bottom heat transfer sheet 200.

Bottom heat transfer sheet 200 is preferably formed of a non-magnetic dielectric material to reduce capacitive coupling from writer 132 to reader 134 and stray dynamic magnetic losses. However, bottom heat transfer sheet 200 can also be formed of the same magnetically conductive material that form the bottom writer pole 138. This allows bottom heat transfer sheet 200 to be formed during the same fabrication step of bottom writer pole 138. Thus, a global deposition may be used to form bottom writer pole 138 and bottom heat transfer sheet 200 outside of the mask used to form bottom writer pole 138 or within a recessed patterned feature behind back side 154 of bottom writer pole 138.

The thickness of the bottom heat transfer sheet 200 can extend beyond bottom pole layer 142. In accordance with one embodiment, bottom heat transfer sheet 200 extends into reader shield layer 177 in which the reader shield 176 is formed, as shown in FIG. 4. Bottom heat transfer sheet 200 can be formed to contact back side 206 of the reader shield 176, or be displaced therefrom by gap 208. This embodiment of bottom heat transfer sheet 200 further enhances heat dissipation by conducting heat away from reader shield 176. The larger size of bottom heat transfer sheet 200 also contributes to greater heat absorption from writer 132 and reader 134.

As mentioned above, bottom heat transfer sheet 200 can be configured to contact a bottom side 210 of second portion 164 of conducting coil 160, as shown in FIG. 4, when bottom heat transfer sheet 200 is formed of a dielectric material. Alternatively, bottom heat transfer sheet 200 can be formed of an electrical conductor when it is displaced from bottom side 210 by an isolation layer 212 formed of an electrically insulating material, as shown in FIG. 3. Isolation layer 212 preferably has a thickness of approximately 0.1 microns.

Figure 5:
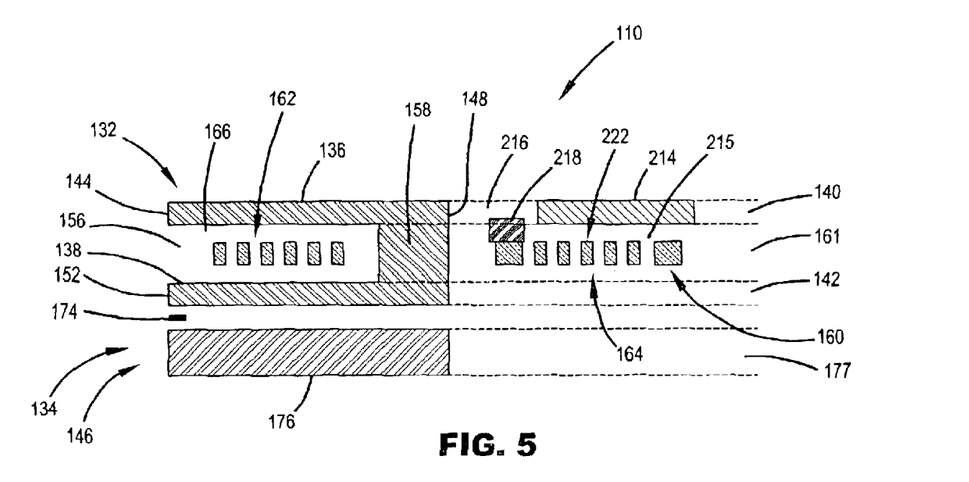

Another form of heat dissipating structure is a top heat transfer sheet 214 that overlays second portion 164 of conducting coil 160. In the embodiments depicted in FIGS. 5 and 6, top heat transfer sheet 214 is at least partially formed in top pole layer 140. As discussed above with regard to bottom heat transfer sheet 200, such a configuration allows top heat transfer sheet 214 to be formed during the same processing step as top writer pole 136. When the thermally conductive material forming top heat transfer sheet 214 is electrically conductive, top heat transfer sheet 214 is displaced from conducting coil 160 by a gap 215 and from back side 148 of top writer pole 136 by a gap 216 as shown in FIG. 5 Each gap 215 and 216 is filled with an electrically insulating material. This embodiment of the invention is further illustrated in the simplified top views of head 110 shown in FIGS. 8A and 8B, where top heat transfer sheet 214 is displaced from top writer pole 136 and a top contact 218 of the conducting coil 160 by the gap 216. As a result, top heat transfer sheet 214 can include first and second portions 214A and 214B that are positioned to respectively cover first and second sides 220A and 220B of second portion 164 of conducting coil 160. Top heat transfer sheet portions 214A and 214B can also cover the second portion 164 of the conducting coil 160 lying in the back region 150 of the head 110.

Figure 6:
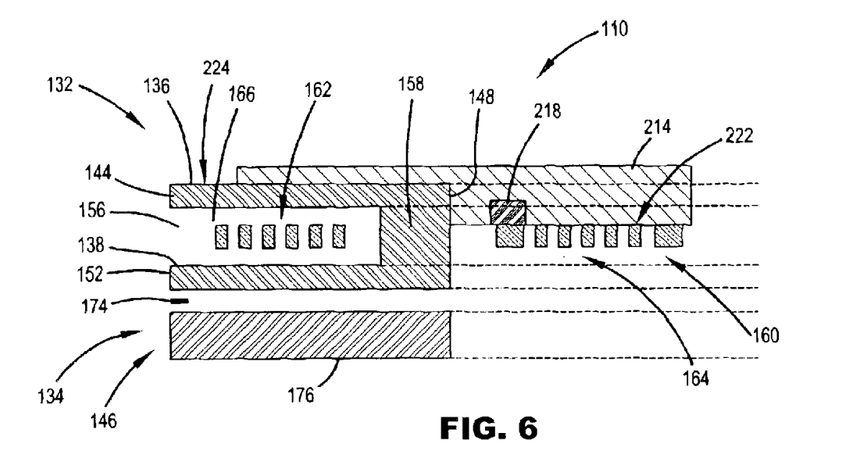

In accordance with another embodiment, the thermally conductive material forming top heat transfer sheet 214 is a dielectric, which allows top heat transfer sheet 214 to contact a top side 222 of second portion 164 of conducting coil 160 including top contact 218, as illustrated in FIG. 6. Such a configuration is also illustrated in the simplified top view of the head 110 in FIGS. 9A and 9B.

Figure 7A:
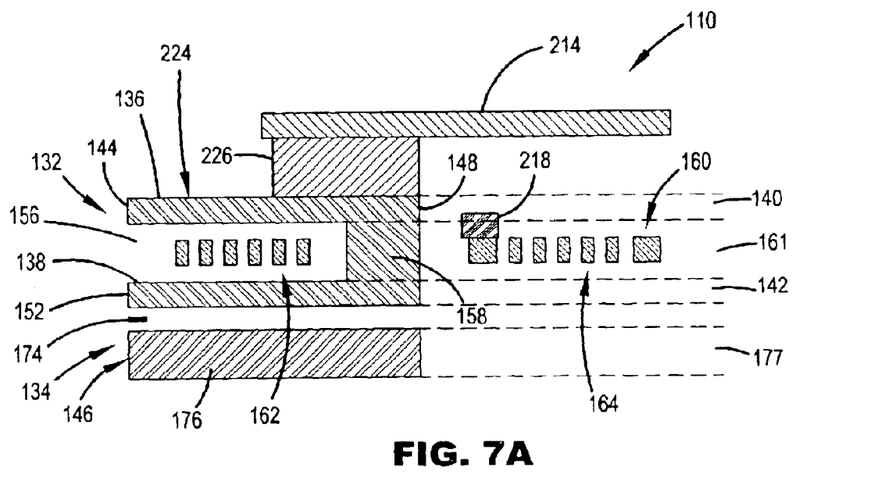
FIGS. 7A and 7B are simplified cross-sectional views of magnetic heads that include a heat dissipating structure in accordance with embodiments of the invention.
Figure 7B:
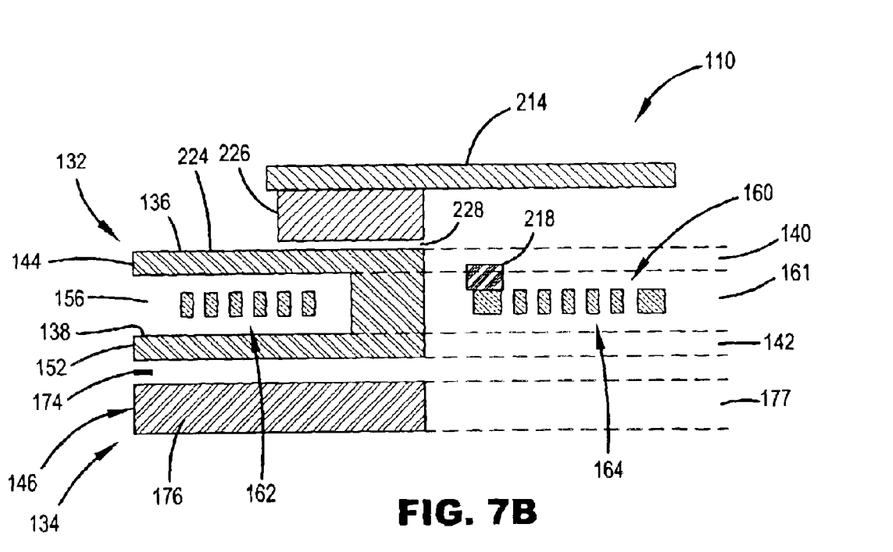
Figure 10A:
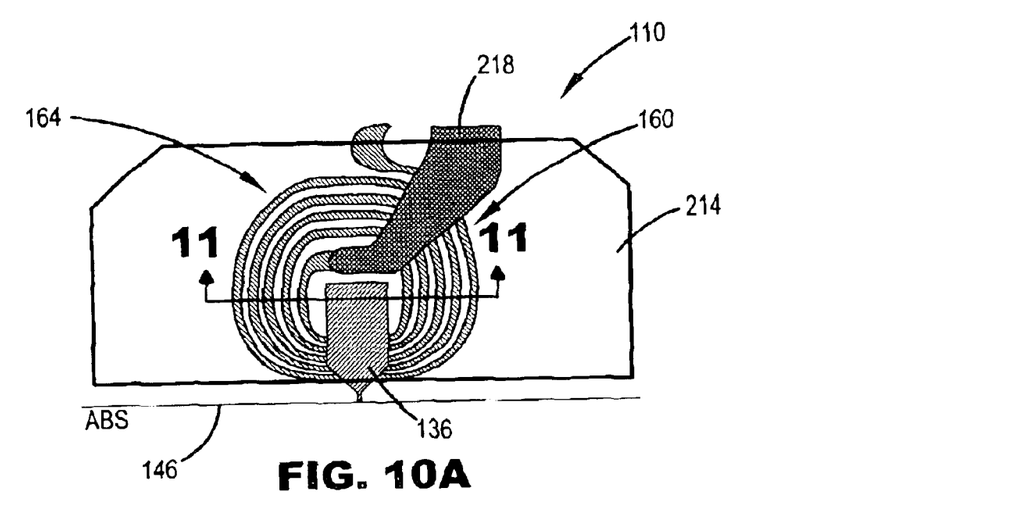
FIGS. 10A and 10B are top views of magnetic heads that include a heat dissipating structure in accordance with embodiments of the invention.
Figure 10B:
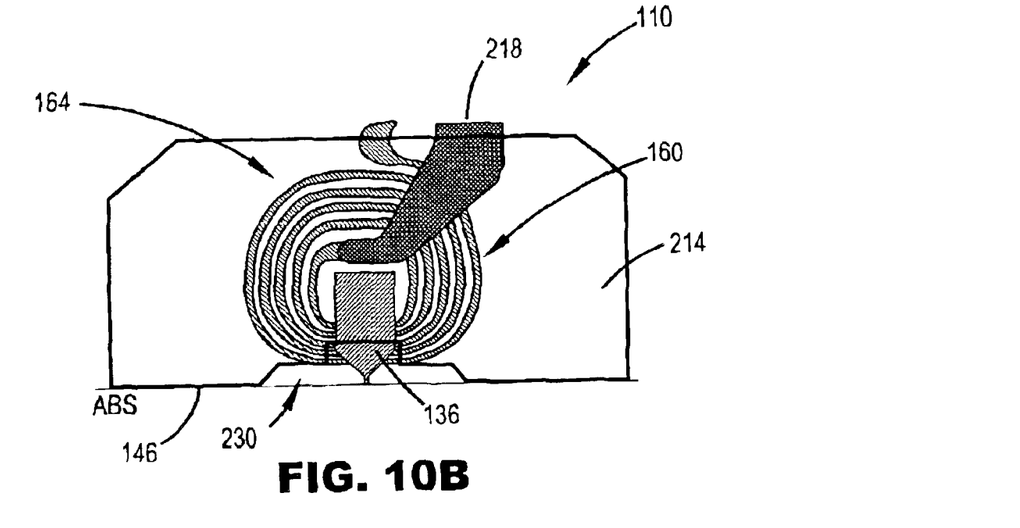

Top heat transfer sheet 214 can also overlay top writer pole 136 as shown in FIGS. 6, 10A and 10B. In accordance with one embodiment, top heat transfer sheet 214 contacts a top side 224 of the top writer pole 136, as shown in FIG. 6, and is formed of a non-magnetic material. Alternatively, top heat transfer sheet 214 can be displaced from top side 224 of top writer pole 136, as shown in FIGS. 7A and 7B. To increase heat transfer from top writer pole 136 to top heat transfer sheet 214, the heat dissipating structure can include a non-magnetic heat transfer segment 226 that connects top heat transfer sheet 214 to top surface 224 of top writer pole 136 through direct contact, as shown in FIG. 7A. Alternatively, heat transfer segment 226 can be separated from top side 224 of top writer pole 136 by a thin isolation or spacer layer 228 as shown in FIG. 7B, when necessary. As a result, the hottest portions of top writer pole 136 can be "tapped" by heat transfer segment 226. The heat transfer segment 226 can be formed using a stud process or other suitable method.

Figure 8A:
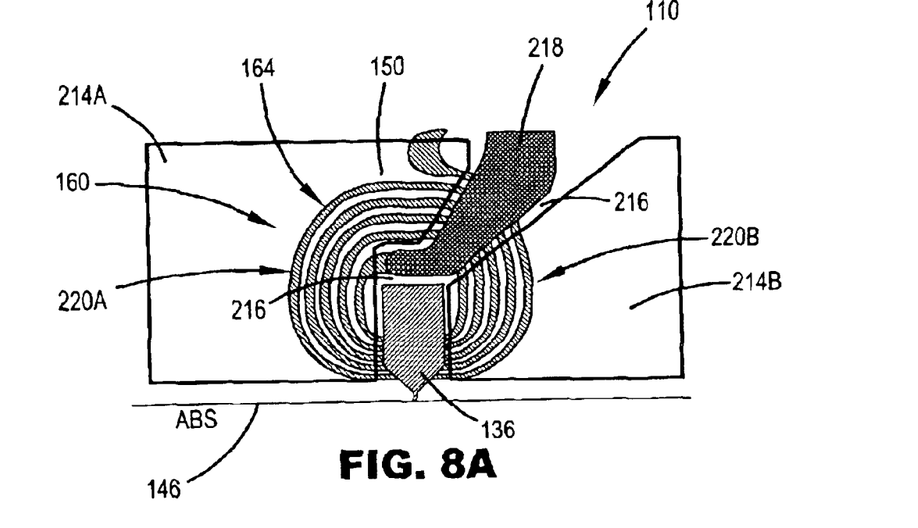
FIGS. 8A and 8B are simplified top views of magnetic heads that include a heat dissipating structure in accordance with embodiments of the invention.
Figure 8B:
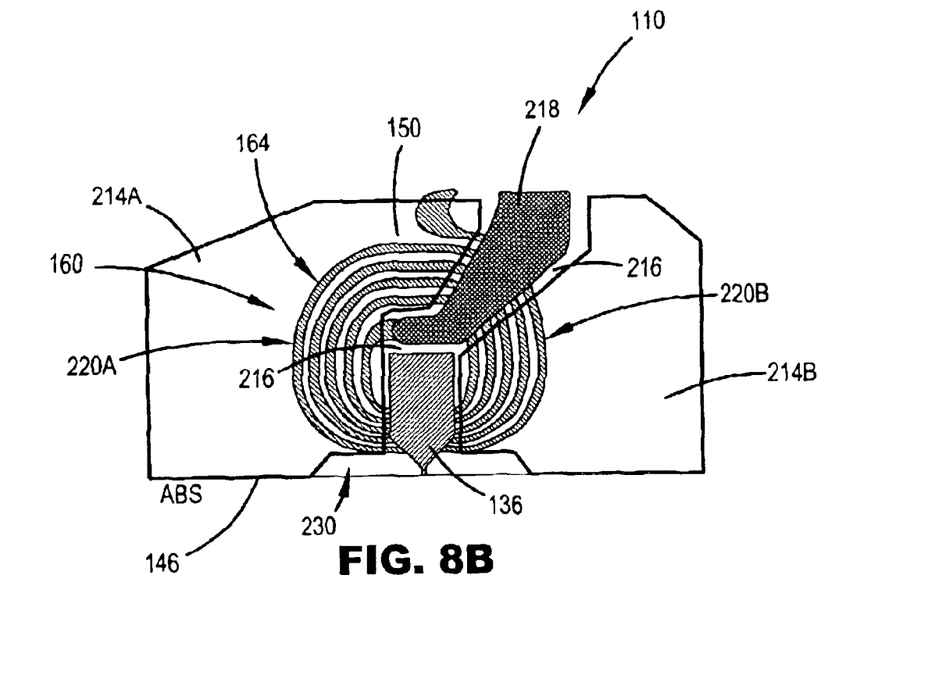
Figure 9A:
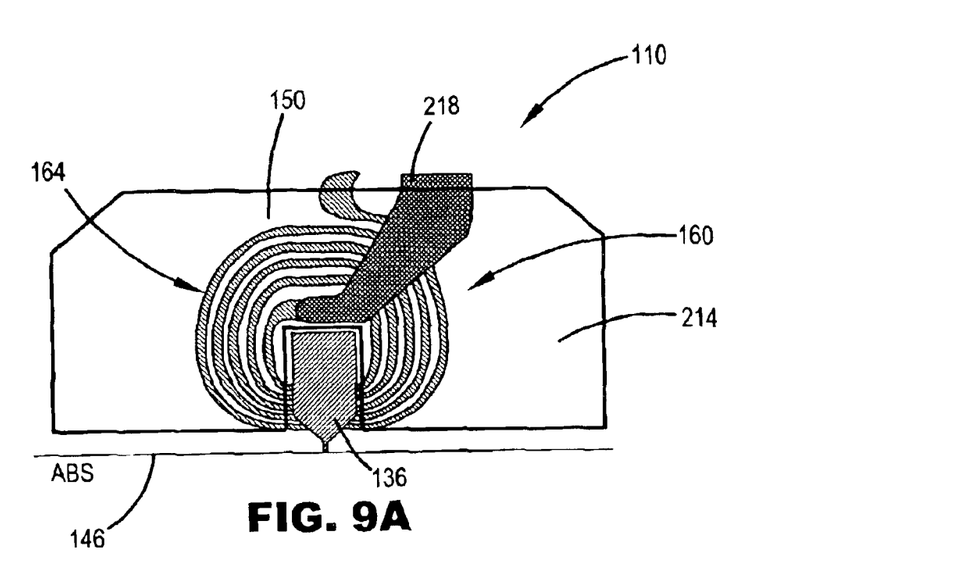
FIGS. 9A and 9B are top views of magnetic heads that include a heat dissipating structure in accordance with embodiments of the invention.
Figure 9B:
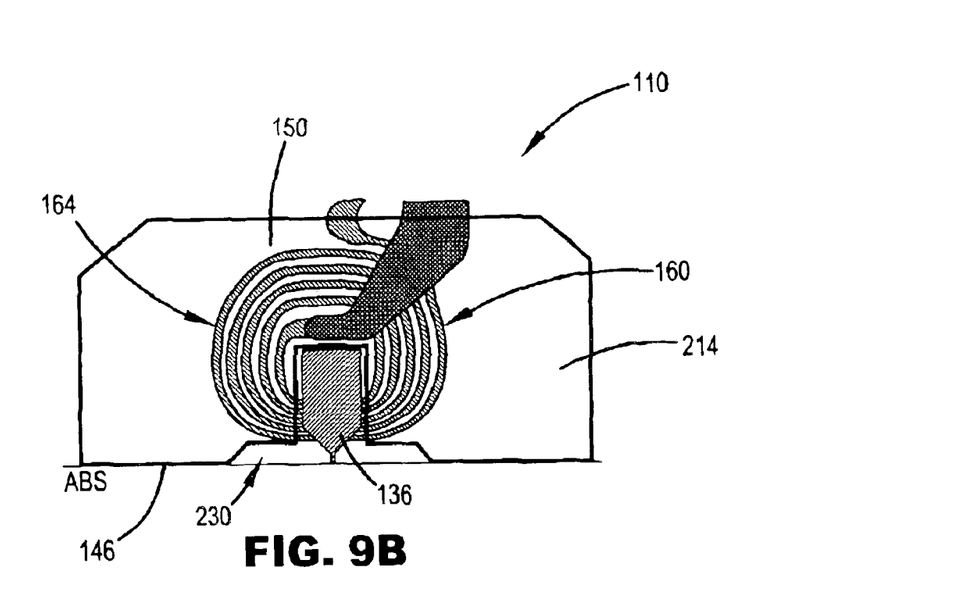

As mentioned above, top heat transfer sheet 214 can cover the entire second portion 164 of conducting coil 160, or portions thereof. Additionally, top heat transfer sheet 214 can extend toward ABS 146 to increase heat transfer from the active region of ABS 146. In accordance with one embodiment of the invention, top heat transfer sheet 214 is displaced slightly from ABS 146 of head 110, as shown in FIGS. 8A, 9A and 10A. This configuration avoids manufacturing constraints and allows for a wider range of materials to be used to form top heat transfer sheet 214. Alternatively, top heat transfer sheet 214 can extend to the ABS 146 to maximize the heat transfer from the active region, as shown in FIGS. 8B, 9B and 10B. In accordance with this embodiment, top heat transfer sheet preferably includes a notch 230 to recess top heat transfer sheet 214 from ABS 146 at the active region to prevent interference with the reading and writing operations of head 110.

Figure 11:
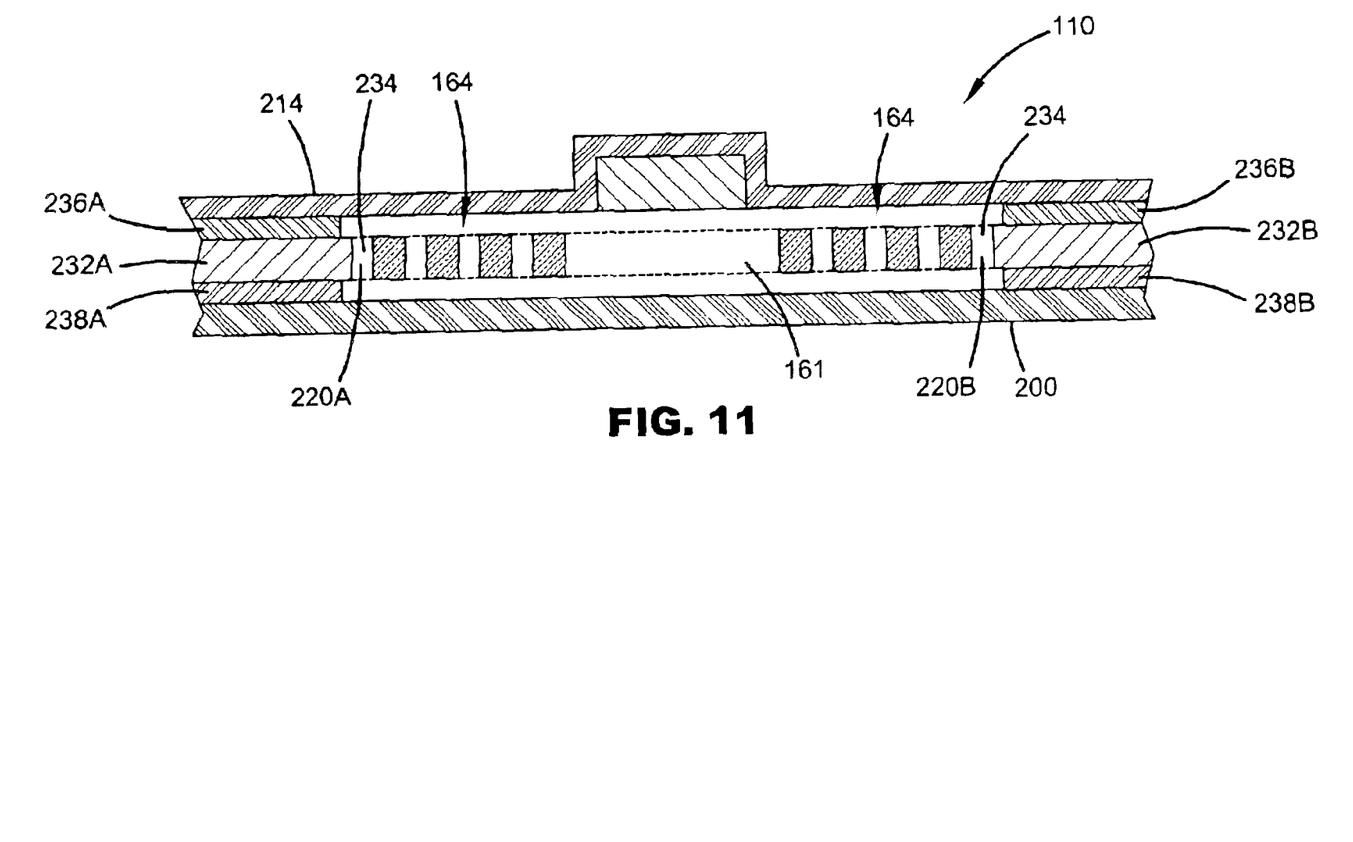
FIG. 11 is a simplified cross-sectional view of the magnetic head depicted in FIG. 10 taken generally along line 11—11, the head including a heat dissipating structure in accordance with embodiments of the invention.

Another embodiment of heat dissipating structure includes one or two side heat transfer members, generally referred to as 232, to provide improved heat dissipation from the writer 132, as shown in FIG. 11. FIG. 11 is a simplified cross-sectional view of head 110 that is taken along line 11—11 of FIG. 10A. A first side heat transfer member 232A is formed in coil layer 161 adjacent first side 220A of second portion 164 of conducting coil 160. Likewise, a second side heat transfer member 232B can be formed in coil layer 161 adjacent second side 220B of second portion 164 of conducting coil 160. The side heat transfer members 232 are isolated from conducting coil 160 by an electrically insulating material fill 234 that is formed between the conducting coil segments. This configuration allows side heat transfer members 232 to be formed of the same material as conducting coil 160. Alternatively, when side heat transfer members 232 are formed of a suitable dielectric, they can be placed in direct contact with conducting coil 160.

The heat dissipating structure of the present invention can include any combination of the above-described structures. Accordingly, the heat dissipating structure can include an embodiment of top heat transfer sheet 214, an embodiment of bottom heat transfer sheet 200, and/or an embodiment of side heat transfer members 232. For example, as illustrated in FIG. 11, the heat dissipating structure can include first and second side heat transfer members 232A and 232B, top heat transfer sheet 214, and bottom heat transfer sheet 200. Additionally, the heat dissipating structure can include thermally conductive segments 236A and 236B can respectively join first and second side heat transfer members 232A and 232B to top heat transfer sheet 214. Similarly; the heat dissipating structure can include thermally conductive segments 238A and 238B that respectively join first and second side heat transfer members 232A and 232B to bottom heat transfer sheet 200.

In summary, the present invention is directed to a magnetic head (such as 110) that includes a heat dissipating structure that improves the dissipation of heat therein to reduce thermally induced performance degradation. The magnetic head includes top and bottom writer poles (such as 136 and 138), a writer conducting coil (such as 160), and the heat dissipating structure. The top and bottom writer poles are respectively formed in top and bottom pole layers (such as 140 and 142). Each writer pole includes a pole tip (such as 144 and 152) at an air-bearing surface (such as 146) and a back side (such as 148 and 154) adjacent a back region (such as 150). The conducting coil is formed in a coil layer (such as 162), extends from the air-bearing surface and includes a first portion (such as 162) that is disposed between the top and bottom writer poles and a second portion (such as 164) that is disposed in the back region. The heat dissipating structure is formed of a thermally conductive material and includes a top heat transfer sheet (such as 214) overlaying the second portion of the conducting coil; a bottom heat transfer sheet (such as 200) that is displaced from the back side of the bottom writer pole and underlays the second portion of the conducting coil; a first side heat transfer member (such as 232A) formed in the coil layer adjacent a first side (such as 220A) of the conducting coil; and/or a second side heat transfer member (such as 232B) formed in the coil layer adjacent a second side (such as 220B) of the conducting coil.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular heat dissipation needs of the magnetic head while maintaining substantially the same functionality and without departing from the scope and spirit of the present invention. Additionally, the present application applies to both longitudinal and perpendicular recording heads.

What is claimed is:

1. A magnetic head comprising:
   a read element;
   top and bottom writer poles respectively formed in top and bottom pole layers and overlaying a layer in which the read element is located, the top pole layer overlaying the bottom pole layer;
   a writer conducting coil formed in a coil layer that is between the top and bottom pole layers, and having a first portion disposed between the top and bottom writer poles, a second portion located beyond the top and bottom writer poles, and a top contact adjacent a top side of the second portion; and
   a top heat transfer sheet formed of a thermally conductive material in the top pole layer and overlaying the second portion of the conducting coil beyond the top contact.

2. The head of claim 1, wherein each pole includes a pole tip at an air bearing surface (ABS) and a back side adjacent the back region.

3. The head of claim 1, wherein the top heat transfer sheet overlays a portion of the top pole.

4. The head of claim 3 including a heat transfer segment joining the top pole to the top heat transfer sheet.

5. The head of claim 1, wherein the top heat transfer sheet overlays the top contact.

6. The head of claim 1, wherein the top heat transfer sheet overlays the top pole and the top contact.

7. The head of claim 2, wherein the top heat transfer sheet extends from proximate the ABS to the back region.

8. The head of claim 2, wherein the read element is located adjacent the ABS between the bottom writer pole and a reader shield, wherein a portion of the top heat transfer sheet is recessed from the ABS such that it does not overlay the read element.

9. The head of claim 1, wherein the top heat transfer sheet contacts the second portion of the conducting coil.

10. The head of claim 2 including a bottom heat transfer sheet formed of a thermally conductive material in the back region of the bottom pole layer, displaced from the back side of the bottom writer pole, and underlaying the second portion of the conducting coil.

11. The head of claim 1, wherein the thermally conductive material has a coefficient of thermal conductivity ($K_{bulk}$) of greater than 10 (watts/meter-Kelvin).

12. The head of claim 1, wherein the top heat transfer sheet is formed of an dielectric material.

13. The head of claim 1, wherein the top heat transfer sheet is formed of an electrically conductive material and is displaced from the second portion of the conducting coil by a layer of dielectric material.

14. The head of claim 1 including a first side heat transfer member formed of a thermally conductive material in the coil layer adjacent a first side of the conducting coil.

15. The head of claim 14 including a thermally conductive segment joining the first side heat transfer member to the top heat transfer sheet.

16. The head of claim 14 including a second side heat transfer member formed of a thermally conductive material in the coil layer adjacent a second side of the conducting coil that is opposite the first side.

17. The head of claim 16 including thermally conductive segments joining the first and second side heat transfer members to the top heat transfer sheet.

18. A magnetic head comprising:
   a read element;

top and bottom writer poles respectively formed in top and bottom pole layers and overlaying a layer in which the read element is located, the top pole layer overlaying the bottom pole layer;

a writer conducting coil formed in a coil layer that is between the top and bottom pole layers, and having a first portion disposed between the top and bottom writer poles, a second portion located beyond the top and bottom writer poles, and a top contact adjacent a top side of the second portion; and a top heat transfer sheet formed of a thermally conductive material, the top heat transfer sheet is positioned in the top pole layer on a side of the writer conducting coil that is opposite that of the read element.

19. The head of claim 18, wherein each pole includes a pole tip at an air bearing surface (ABS) and a back side adjacent the back region.

20. The head of claim 18, wherein the top heat transfer sheet overlays a portion of the top pole.

21. The head of claim 20 including a heat transfer segment joining the top pole to the top heat transfer sheet.

22. The head of claim 18, wherein the top heat transfer sheet overlays the top contact.

23. The head of claim 18, wherein the top heat transfer sheet overlays the top pole and the top contact.

24. The head of claim 19, wherein the top heat transfer sheet extends from proximate the ABS to the back region.

25. The head of claim 24, wherein the read element is located adjacent the ABS between the bottom writer pole and a reader shield, wherein a portion of the top heat transfer sheet is recessed from the ABS such that it does not overlay the read element.

26. The head of claim 18, wherein the top heat transfer sheet contacts the second portion of the conducting coil.

27. The head of claim 18, wherein the top heat transfer sheet is formed of an dielectric material.

28. The head of claim 18, wherein the top heat transfer sheet is formed of an electrically conductive material and is displaced from the second portion of the conducting coil by a layer of dielectric material.

* * * * *